US012701490B2

(12) United States Patent
Godin et al.

(10) Patent No.: US 12,701,490 B2
(45) Date of Patent: Aug. 4, 2026

(54) SHARED CU UP ADDRESS MANAGEMENT

(71) Applicant: Nokia Solutions and Networks Oy, Espoo (FI)

(72) Inventors: Philippe Godin, Massy (FR); Bruno Landais, Lannion (FR); Horst Thomas Belling, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 559 days.

(21) Appl. No.: 18/189,852

(22) Filed: Mar. 24, 2023

(65) Prior Publication Data
US 2023/0319677 A1 Oct. 5, 2023

(30) Foreign Application Priority Data
Mar. 29, 2022 (GB) ...................................... 2204457

(51) Int. Cl.
*H04W 4/06* (2009.01)
*H04W 40/02* (2009.01)
(Continued)

(52) U.S. Cl.
CPC ....... *H04W 40/023* (2013.01); *H04W 40/248* (2013.01); *H04W 72/30* (2023.01)

(58) Field of Classification Search
CPC . H04W 40/023; H04W 40/248; H04W 72/30; H04W 4/06; H04W 76/40; H04W 76/11; H04W 36/0007
See application file for complete search history.

(56) References Cited

U.S. PATENT DOCUMENTS

2019/0394833 A1* 12/2019 Talebi Fard .......... H04W 60/00
2020/0351984 A1 11/2020 Talebi Fard et al.
(Continued)

FOREIGN PATENT DOCUMENTS

CN 110167051 A 8/2019
CN 112056003 A 12/2020
(Continued)

OTHER PUBLICATIONS

"3rd Generation Partnership Project; Technical Specification Group Services and System Aspects; Architectural enhancements for 5G multicast-broadcast services; Stage 2 (Release 17)", 3GPP TS 23.247, V17.1.0, Dec. 2021, pp. 1-102.
(Continued)

*Primary Examiner* — Shukri Taha
(74) *Attorney, Agent, or Firm* — Nokia Solutions and Networks Oy

(57) ABSTRACT

There is provided an apparatus, said apparatus comprising, at a multicast/broadcast session management function of a core network, means for receiving information related to a shared centralised unit user plane, CU UP for a multicast/ broadcast session, from a radio access network, RAN, node or an access management function of the core network, means for determining, based on the information, whether to configure a user plane function of the core network to deliver data or to terminate delivery of data for the multicast/ broadcast session towards the shared CU UP and means for, if so, configuring the user plane function to deliver data or to terminate delivery of data for the multicast/broadcast session towards the shared CU UP.

18 Claims, 9 Drawing Sheets

(51) Int. Cl.
  H04W 40/24 (2009.01)
  H04W 72/30 (2023.01)

(56) References Cited

U.S. PATENT DOCUMENTS

| | | | | |
|---|---|---|---|---|
| 2024/0172328 A1* | 5/2024 | Ling | | H04W 76/40 |
| 2025/0008593 A1* | 1/2025 | Wu | | H04W 76/40 |

FOREIGN PATENT DOCUMENTS

| | | | | |
|---|---|---|---|---|
| CN | 112567879 A | 3/2021 | | |
| EP | 3700223 A1 | 8/2020 | | |
| WO | WO-2022015046 A1 * | 1/2022 | | H04L 12/189 |

OTHER PUBLICATIONS

"3rd Generation Partnership Project; Technical Specification Group Radio Access Network; NG-RAN; NG Application Protocol (NGAP) (Release 16)", 3GPP TS 38.413, V16.8.0, Dec. 2021, pp. 1-475.

"3rd Generation Partnership Project; Technical Specification Group Radio Access Network; NG-RAN; E1 Application Protocol (E1AP) (Release 16)", 3GPP TS 38.463, V16.8.0, Dec. 2021, pp. 1-245.

Search Report received for corresponding United Kingdom Patent Application No. 2204457.2, dated Sep. 16, 2022, 3 pages.

Extended European Search Report received for corresponding European Patent Application No. 23163739.8, dated Aug. 28, 2023, 10 pages.

"Supporting lossless handover while retaining flexible MRB mapping", 3GPP TSG-RAN WG3 #115-e, R3-222025, Agenda: 22.3.1, CATT, Feb. 21-Mar. 3, 2022, pp. 1-7.

"Correction of address management for shared CU UP", 3GPP TSG-RAN WG3#117-e, R3-224442, Agenda: 9.2.7, Nokia, Aug. 15-24, 2022, pp. 1-3.

"3rd Generation Partnership Project; Technical Specification Group Services and System Aspects; Architectural enhancements for 5G multicast-broadcast services; Stage 2 (Release 17)", 3GPP TS 23.247, V17.2.0, Mar. 2022, pp. 1-108.

Office action received for corresponding Chinese Patent Application No. 202310313554.6, dated Dec. 15, 2025, 6 pages of office action and 3 pages of translation available.

* cited by examiner

Figure 4:
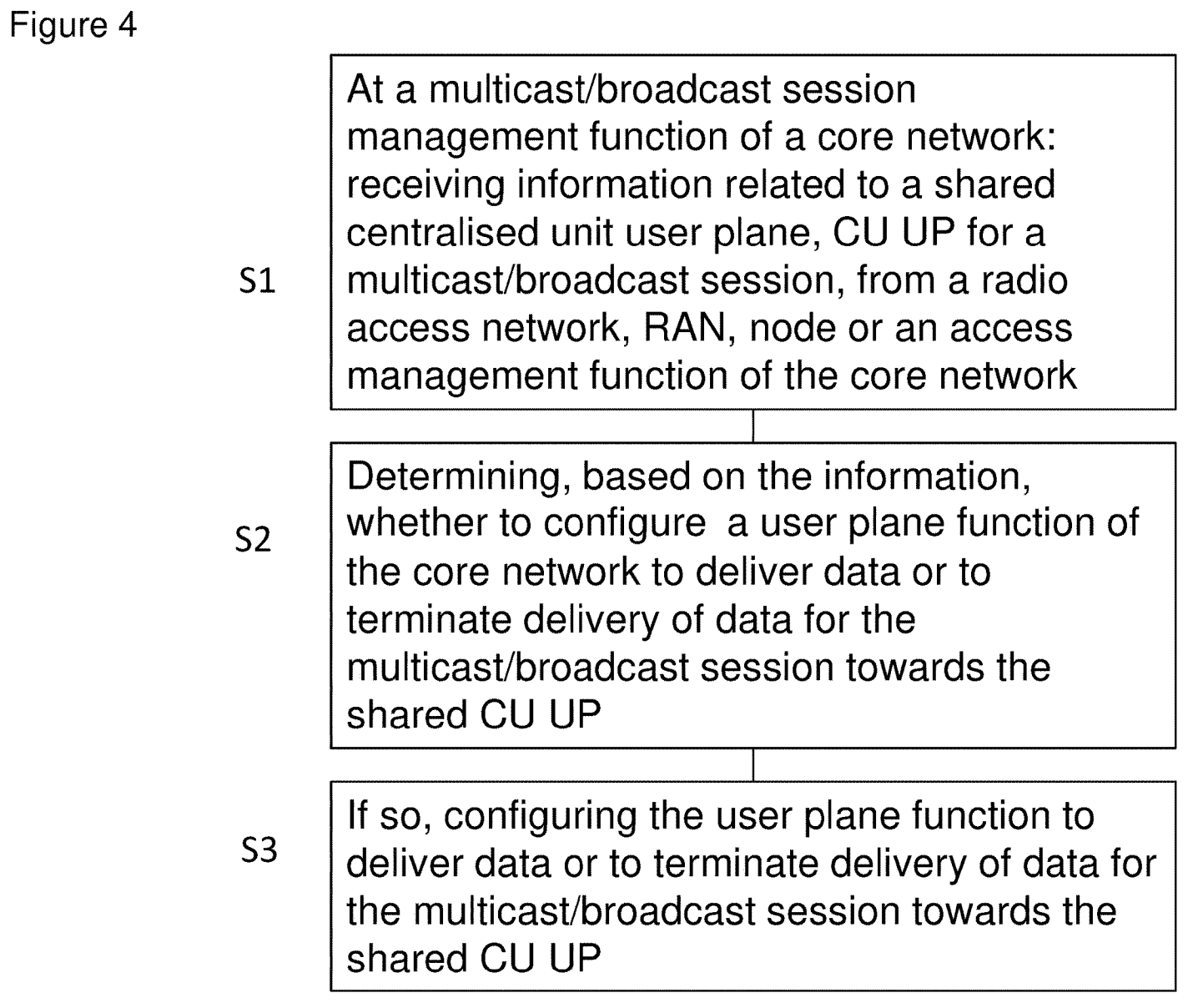

At a multicast/broadcast session management function of a core network: receiving information related to a shared centralised unit user plane, CU UP for a multicast/broadcast session, from a radio access network, RAN, node or an access management function of the core network

S2

Determining, based on the information, whether to configure a user plane function of the core network to deliver data or to terminate delivery of data for the multicast/broadcast session towards the shared CU UP

S3

If so, configuring the user plane function to deliver data or to terminate delivery of data for the multicast/broadcast session towards the shared CU UP

Figure 5:
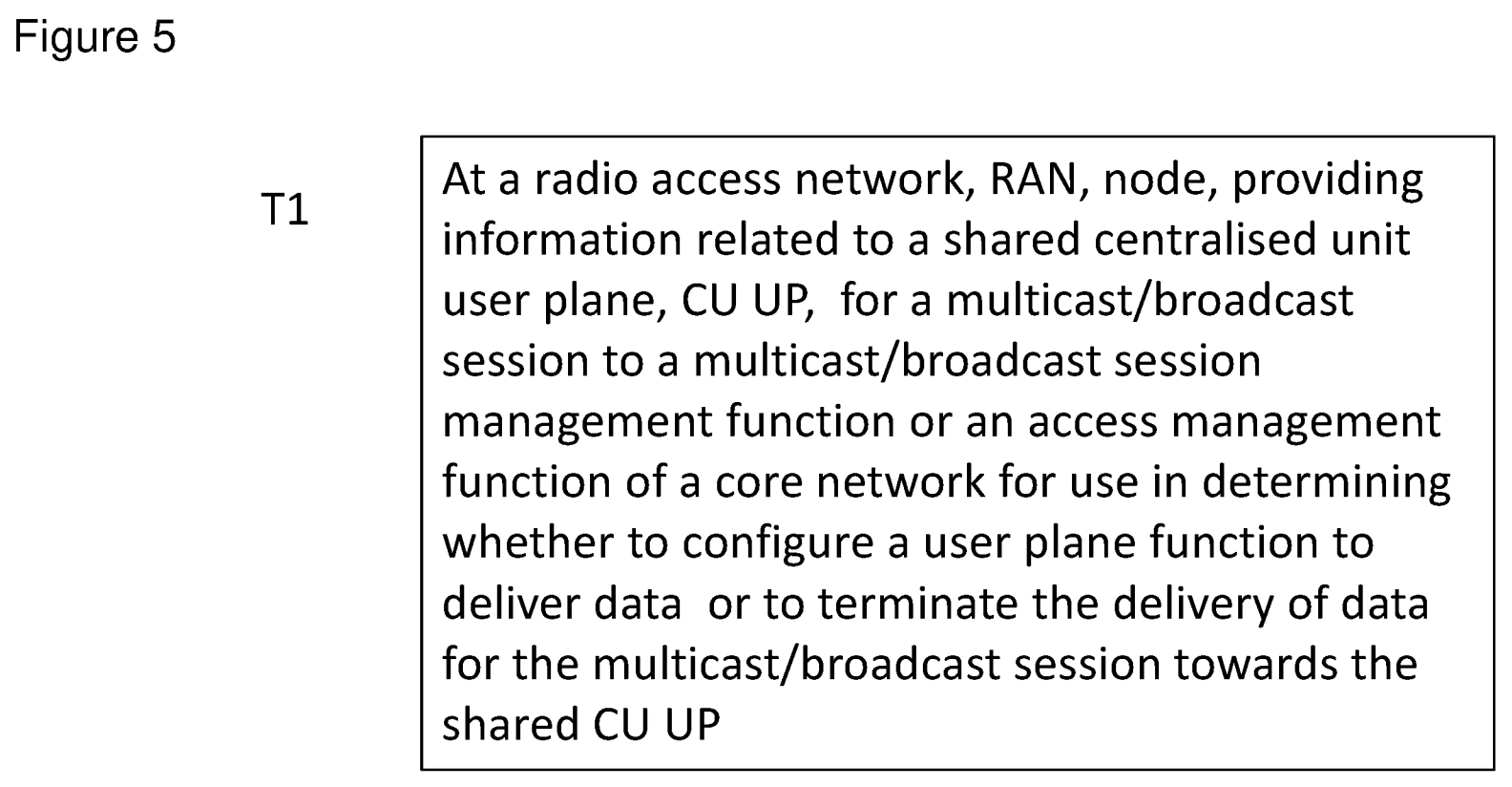

At a radio access network, RAN, node, providing information related to a shared centralised unit user plane, CU UP, for a multicast/broadcast session to a multicast/broadcast session management function or an access management function of a core network for use in determining whether to configure a user plane function to deliver data or to terminate the delivery of data for the multicast/broadcast session towards the shared CU UP

SHARED CU UP ADDRESS MANAGEMENT

RELATED APPLICATION

This application claims priority to Great Britain Patent Application No. GB2204457.2, filed Mar. 29, 2022, and entitled "SHARED CU UP ADDRESS MANAGEMENT," which is incorporated herein by reference in its entirety.

FIELD

The present application relates to a method, apparatus, system and computer program and in particular but not exclusively to shared Centralised Unit (CU) User plane (UP) address management.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising, at a multicast/broadcast session management function of a core network, means for receiving information related to a shared centralised unit user plane, CU UP for a multicast/broadcast session, from a radio access network, RAN, node or an access management function of the core network, means for determining, based on the information, whether to configure a user plane function of the core network to deliver data or to terminate delivery of data for the multicast/broadcast session towards the shared CU UP and means for, if so, configuring the user plane function to deliver data or to terminate delivery of data for the multicast/broadcast session towards the shared CU UP.

The information related to the shared CU UP may comprise an indication that delivery of data for the multicast/broadcast session towards the shared CU UP has already been requested.

The apparatus may comprise means for configuring the user plane function to deliver data for the multicast/broadcast session towards the shared CU UP if no indication that delivery of data for the multicast/broadcast session towards the shared CU UP has already been requested is received.

The information related to the shared CU UP may comprise an indication that the RAN node or AMF is no longer involved in the multicast/broadcast session and an indication whether the delivery of data for the multicast/broadcast session towards the shared CU UP is to be continued.

The apparatus may comprise means for configuring the user plane function to terminate the delivery of data for the multicast/broadcast session towards the shared CU UP if an indication that the RAN node is no longer involved in the multicast/broadcast session and no indication that the delivery of data for the multicast/broadcast session towards the shared CU UP is to be continued is received.

The information may comprise an identity associated with the RAN node and an indication whether delivery of data or termination of the delivery of data is requested.

The apparatus may comprise means for configuring the user plane function to deliver data for the multicast/broadcast session towards the shared CU UP if an indication that the delivery of data is requested is received and no other RAN node previously requested delivery of data for the multicast/broadcast session towards the shared CU UP.

The apparatus may comprise means for configuring the user plane function to terminate the delivery of data for the multicast/broadcast session towards the shared CU UP if an indication that the termination of the delivery of data is requested is received and no other RAN node still requires the delivery of data for the multicast/broadcast session towards the shared CU UP.

The information may further comprise at least one of an indication that the CU UP is shared and a global identity associated with the shared CU UP.

The apparatus may comprise means for storing the identity of RAN nodes in association with an identity associated with the shared CU UP.

The identity associated with the shared CU UP may be a transport layer address.

The identity associated with the shared CU UP may be a logical network node identity globally unique in a Public Land Mobile Network.

The RAN node may comprise a centralised unit control plane, CU CP, and the means for receiving information from the RAN node may be for receiving information from the CU CP.

In a second aspect there is provided an apparatus comprising, at a radio access network, RAN, node means for providing information related to a shared centralised unit user plane, CU UP, for a multicast/broadcast session to a multicast/broadcast session management function or an access management function of a core network for use in determining whether to configure a user plane function to deliver data or to terminate the delivery of data for the multicast/broadcast session towards the shared CU UP.

The apparatus may comprise means for receiving an indication from the shared CU UP at the RAN node that an identity associated with the shared CU UP has been provided to another RAN node and means for providing the information based on the indication.

The information may comprise an indication that an identity associated with the shared CU UP has already been provided.

The apparatus may comprise means for indicating to the shared CU UP that the apparatus is no longer involved in the multicast/broadcast session and receiving in response an indication whether the delivery of data for the multicast/broadcast session towards the identity associated with the shared CU UP is to be continued and means for providing the information based on the indication.

The information may comprise an indication that the RAN node is no longer involved in the multicast/broadcast session and an indication whether the delivery of data for the multicast/broadcast session towards the identity associated with the shared CU UP is to be continued.

The information may comprise an identity associated with the RAN node.

The information may further comprise at least one of an indication that the CU UP is shared and a global identify associated with the shared CU UP.

The RAN node may comprise a centralised unit control plane, CU CP.

The identity associated with the shared CU UP may be at least one of a transport layer address and a globally unique identity of the shared CU UP.

In a third aspect there is provided a method comprising, at a multicast/broadcast session management function of a core network, receiving information related to a shared centralised unit user plane, CU UP for a multicast/broadcast session, from a radio access network, RAN, node or an access management function of the core network, determining, based on the information, whether to configure a user plane function of the core network to deliver data or to terminate delivery of data for the multicast/broadcast session towards the shared CU UP and, if so, configuring the user plane function to deliver data or to terminate delivery of data for the multicast/broadcast session towards the shared CU UP.

The information related to the shared CU UP may comprise an indication that delivery of data for the multicast/broadcast session towards the shared CU UP has already been requested.

The method may comprise configuring the user plane function to deliver data for the multicast/broadcast session towards the shared CU UP if no indication that delivery of data for the multicast/broadcast session towards the shared CU UP has already been requested is received.

The information related to the shared CU UP may comprise an indication that the RAN node or AMF is no longer involved in the multicast/broadcast session and an indication whether the delivery of data for the multicast/broadcast session towards the shared CU UP is to be continued.

The method may comprise configuring the user plane function to terminate the delivery of data for the multicast/broadcast session towards the shared CU UP if an indication that the RAN node is no longer involved in the multicast/broadcast session and no indication that the delivery of data for the multicast/broadcast session towards the shared CU UP is to be continued is received.

The information may comprise an identity associated with the RAN node and an indication whether delivery of data or termination of the delivery of data is requested.

The method may comprise configuring the user plane function to deliver data for the multicast/broadcast session towards the shared CU UP if an indication that the delivery of data is requested is received and no other RAN node previously requested delivery of data for the multicast/broadcast session towards the shared CU UP.

The method may comprise configuring the user plane function to terminate the delivery of data for the multicast/broadcast session towards the shared CU UP if an indication that the termination of the delivery of data is requested is received and no other RAN node still requires the delivery of data for the multicast/broadcast session towards the shared CU UP.

The information may further comprise at least one of an indication that the CU UP is shared and a global identity associated with the shared CU UP.

The apparatus may comprise means for storing the identity of RAN nodes in association with an identity associated with the shared CU UP.

The identity associated with the shared CU UP may be a transport layer address.

The identity associated with the shared CU UP may be a logical network node identity globally unique in a Public Land Mobile Network.

The RAN node may comprise a centralised unit control plane, CU CP, and the means for receiving information from the RAN node may be for receiving information from the CU CP.

In a fourth aspect there is provided a method comprising, at a radio access network, RAN, node providing information related to a shared centralised unit user plane, CU UP, for a multicast/broadcast session to a multicast/broadcast session management function or an access management function of a core network for use in determining whether to configure a user plane function to deliver data or to terminate the delivery of data for the multicast/broadcast session towards the shared CU UP.

The method may comprise receiving an indication from the shared CU UP at the RAN node that an identity associated with the shared CU UP has been provided to another RAN node and providing the information based on the indication.

The information may comprise an indication that an identity associated with the shared CU UP has already been provided.

The method may comprise indicating to the shared CU UP that the apparatus is no longer involved in the multicast/broadcast session and receiving in response an indication whether the delivery of data for the multicast/broadcast session towards the identity associated with the shared CU UP is to be continued and providing the information based on the indication.

The information may comprise an indication that the RAN node is no longer involved in the multicast/broadcast session and an indication whether the delivery of data for the multicast/broadcast session towards the identity associated with the shared CU UP is to be continued.

The information may comprise an identity associated with the RAN node.

The information may further comprise at least one of an indication that the CU UP is shared and a global identify associated with the shared CU UP.

The RAN node may comprise a centralised unit control plane, CU CP.

The identity associated with the shared CU UP may be at least one of a transport layer address and a globally unique identity of the shared CU UP.

In a fifth aspect there is provided an apparatus comprising: at least one processor and at least one memory including a computer program code, the at least one memory and computer program code configured to, with the at least one processor, cause the apparatus at least to, at a multicast/broadcast session management function of a core network, receive information related to a shared centralised unit user plane, CU UP for a multicast/broadcast session, from a radio access network, RAN, node or an access management function of the core network; determine, based on the information, whether to configure a user plane function of the core network to deliver data or to terminate delivery of data for the multicast/broadcast session towards the shared CU UP and, if so, configure the user plane function to deliver data or to terminate delivery of data for the multicast/broadcast session towards the shared CU UP.

The information related to the shared CU UP may comprise an indication that delivery of data for the multicast/broadcast session towards the shared CU UP has already been requested.

The apparatus may be configured to configure the user plane function to deliver data for the multicast/broadcast session towards the shared CU UP if no indication that delivery of data for the multicast/broadcast session towards the shared CU UP has already been requested is received.

The information related to the shared CU UP may comprise an indication that the RAN node or AMF is no longer involved in the multicast/broadcast session and an indication whether the delivery of data for the multicast/broadcast session towards the shared CU UP is to be continued.

The apparatus may be configured to configure the user plane function to terminate the delivery of data for the multicast/broadcast session towards the shared CU UP if an indication that the RAN node is no longer involved in the multicast/broadcast session and no indication that the delivery of data for the multicast/broadcast session towards the shared CU UP is to be continued is received.

The information may comprise an identity associated with the RAN node and an indication whether delivery of data or termination of the delivery of data is requested.

The apparatus may be configured to configure the user plane function to deliver data for the multicast/broadcast session towards the shared CU UP if an indication that the delivery of data is requested is received and no other RAN node previously requested delivery of data for the multicast/broadcast session towards the shared CU UP.

The apparatus may be configured to configure the user plane function to terminate the delivery of data for the multicast/broadcast session towards the shared CU UP if an indication that the termination of the delivery of data is requested is received and no other RAN node still requires the delivery of data for the multicast/broadcast session towards the shared CU UP.

The information may further comprise at least one of an indication that the CU UP is shared and a global identity associated with the shared CU UP.

The apparatus may comprise means for storing the identity of RAN nodes in association with an identity associated with the shared CU UP.

The identity associated with the shared CU UP may be a transport layer address.

The identity associated with the shared CU UP may be a logical network node identity globally unique in a Public Land Mobile Network.

The RAN node may comprise a centralised unit control plane, CU CP, and the means for receiving information from the RAN node may be for receiving information from the CU CP.

In a sixth aspect there is provided an apparatus comprising: at least one processor and at least one memory including a computer program code, the at least one memory and computer program code configured to, with the at least one processor, cause the apparatus at least to, at a radio access network, RAN, node, provide information related to a shared centralised unit user plane, CU UP, for a multicast/broadcast session to a multicast/broadcast session management function of a core network or an access management function of the core network for use in determining whether to configure a user plane function of the core network to deliver data or to terminate the delivery of data for the multicast/broadcast session towards the shared CU UP.

The apparatus may be configured to receive an indication from the shared CU UP at the RAN node that an identity associated with the shared CU UP has been provided to another RAN node and provide the information based on the indication.

The information may comprise an indication that an identity associated with the shared CU UP has already been provided.

The apparatus may be configured to indicate to the shared CU UP that the apparatus is no longer involved in the multicast/broadcast session and receiving in response an indication whether the delivery of data for the multicast/broadcast session towards the identity associated with the shared CU UP is to be continued and provide the information based on the indication.

The information may comprise an indication that the RAN node is no longer involved in the multicast/broadcast session and an indication whether the delivery of data for the multicast/broadcast session towards the identity associated with the shared CU UP is to be continued.

The information may comprise an identity associated with the RAN node.

The information may further comprise at least one of an indication that the CU UP is shared and a global identify associated with the shared CU UP.

The RAN node may comprise a centralised unit control plane, CU CP.

The identity associated with the shared CU UP may be at least one of a transport layer address and a globally unique identity of the shared CU UP.

In a seventh aspect there is provided a computer readable medium comprising program instructions for causing an apparatus to perform at least the following, at a multicast/broadcast session management function of a core network, receiving information related to a shared centralised unit user plane, CU UP for a multicast/broadcast session, from a radio access network, RAN, node or an access management function of the core network, determining, based on the information, whether to configure a user plane function of the core network to deliver data or to terminate delivery of data for the multicast/broadcast session towards the shared CU UP and if so, configuring the user plane function to deliver data or to terminate delivery of data for the multicast/broadcast session towards the shared CU UP.

The information related to the shared CU UP may comprise an indication that delivery of data for the multicast/broadcast session towards the shared CU UP has already been requested.

The apparatus may be caused to perform configuring the user plane function to deliver data for the multicast/broadcast session towards the shared CU UP if no indication that delivery of data for the multicast/broadcast session towards the shared CU UP has already been requested is received.

The information related to the shared CU UP may comprise an indication that the RAN node or AMF is no longer involved in the multicast/broadcast session and an indication whether the delivery of data for the multicast/broadcast session towards the shared CU UP is to be continued.

The apparatus may be caused to perform configuring the user plane function to terminate the delivery of data for the multicast/broadcast session towards the shared CU UP if an indication that the RAN node is no longer involved in the multicast/broadcast session and no indication that the delivery of data for the multicast/broadcast session towards the shared CU UP is to be continued is received.

The information may comprise an identity associated with the RAN node and an indication whether delivery of data or termination of the delivery of data is requested.

The apparatus may be caused to perform configuring the user plane function to deliver data for the multicast/broadcast session towards the shared CU UP if an indication that the delivery of data is requested is received and no other RAN node previously requested delivery of data for the multicast/broadcast session towards the shared CU UP.

The apparatus may be caused to perform configuring the user plane function to terminate the delivery of data for the multicast/broadcast session towards the shared CU UP if an indication that the termination of the delivery of data is requested is received and no other RAN node still requires the delivery of data for the multicast/broadcast session towards the shared CU UP.

The information may further comprise at least one of an indication that the CU UP is shared and a global identity associated with the shared CU UP.

The apparatus may be caused to perform storing the identity of RAN nodes in association with an identity associated with the shared CU UP.

The identity associated with the shared CU UP may be a transport layer address.

The identity associated with the shared CU UP may be a logical network node identity globally unique in a Public Land Mobile Network.

The RAN node may comprise a centralised unit control plane, CU CP, and the means for receiving information from the RAN node may be for receiving information from the CU CP.

In an eight aspect there is provided a computer readable medium comprising program instructions for causing an apparatus to perform at least the following, at a radio access network, RAN, node, providing information related to a shared centralised unit user plane, CU UP, for a multicast/broadcast session to a multicast/broadcast session management function of a core network or an access management function of the core network for use in determining whether to configure a user plane function of the core network to deliver data or to terminate the delivery of data for the multicast/broadcast session towards the shared CU UP.

The apparatus may be caused to perform receiving an indication from the shared CU UP at the RAN node that an identity associated with the shared CU UP has been provided to another RAN node and providing the information based on the indication.

The information may comprise an indication that an identity associated with the shared CU UP has already been provided.

The apparatus may be caused to perform indicating to the shared CU UP that the apparatus is no longer involved in the multicast/broadcast session and receiving in response an indication whether the delivery of data for the multicast/broadcast session towards the identity associated with the shared CU UP is to be continued and providing the information based on the indication.

The information may comprise an indication that the RAN node is no longer involved in the multicast/broadcast session and an indication whether the delivery of data for the multicast/broadcast session towards the identity associated with the shared CU UP is to be continued.

The information may comprise an identity associated with the RAN node.

The information may further comprise at least one of an indication that the CU UP is shared and a global identify associated with the shared CU UP.

The RAN node may comprise a centralised unit control plane, CU CP.

The identity associated with the shared CU UP may be at least one of a transport layer address and a globally unique identity of the shared CU UP.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows a flowchart of a method according to an example embodiment;

FIG. 5 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for example QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

5G networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
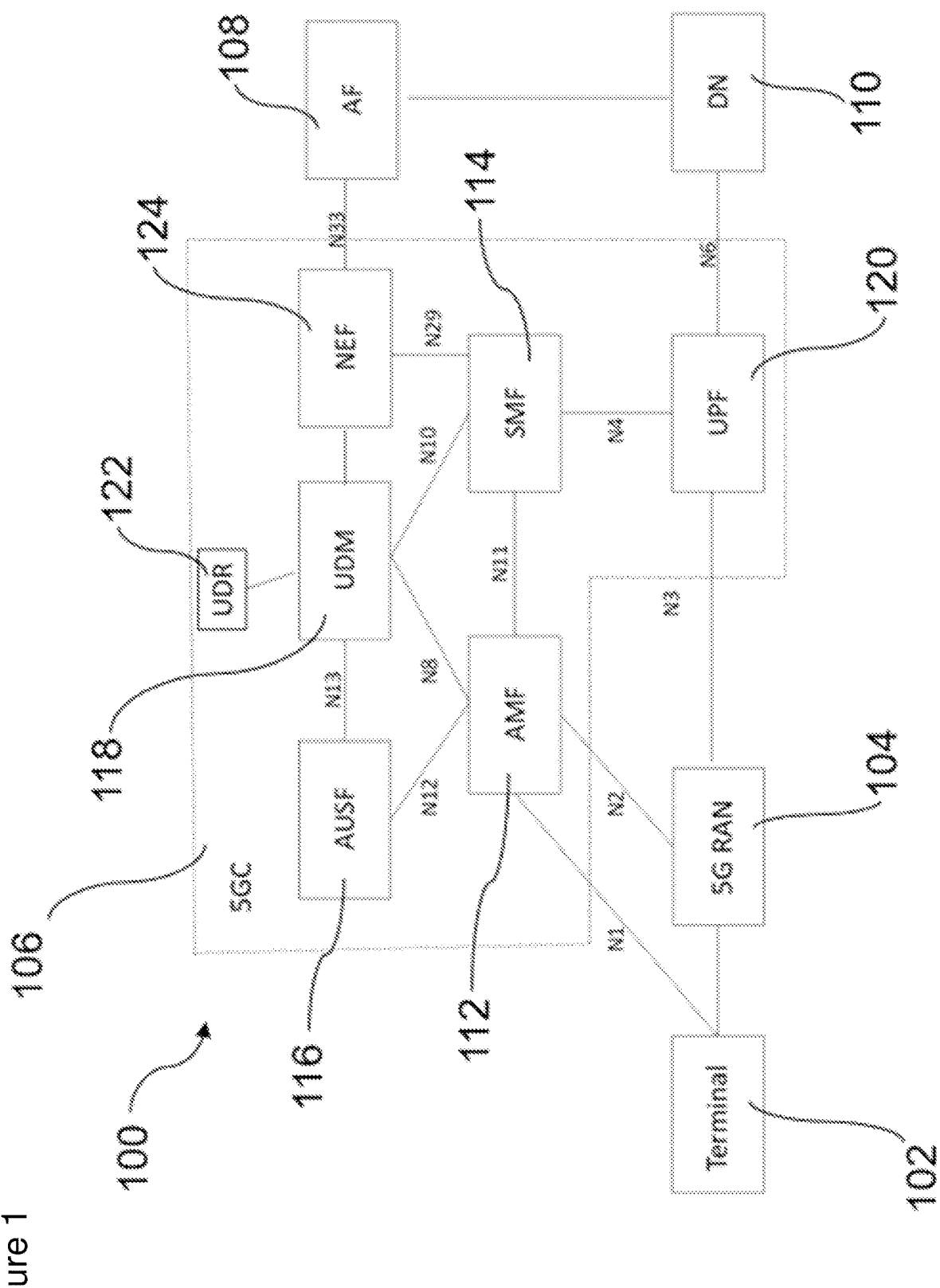
FIG. 1 shows a schematic diagram of an example 5GS communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a terminal device via the radio access network (RAN). The 5GRAN may comprise one or more gNodeB (GNB) distributed unit functions connected to one or more gNodeB (GNB) centralized unit functions. The RAN may comprise one or more access nodes.

A UPF (User Plane Function) whose role is called PSA (Protocol Data Unit (PDU) Session Anchor) may be responsible for forwarding frames back and forth between the DN (data network) and the tunnels established over the 5G towards the UE(s) exchanging traffic with the DN.

Figure 2:
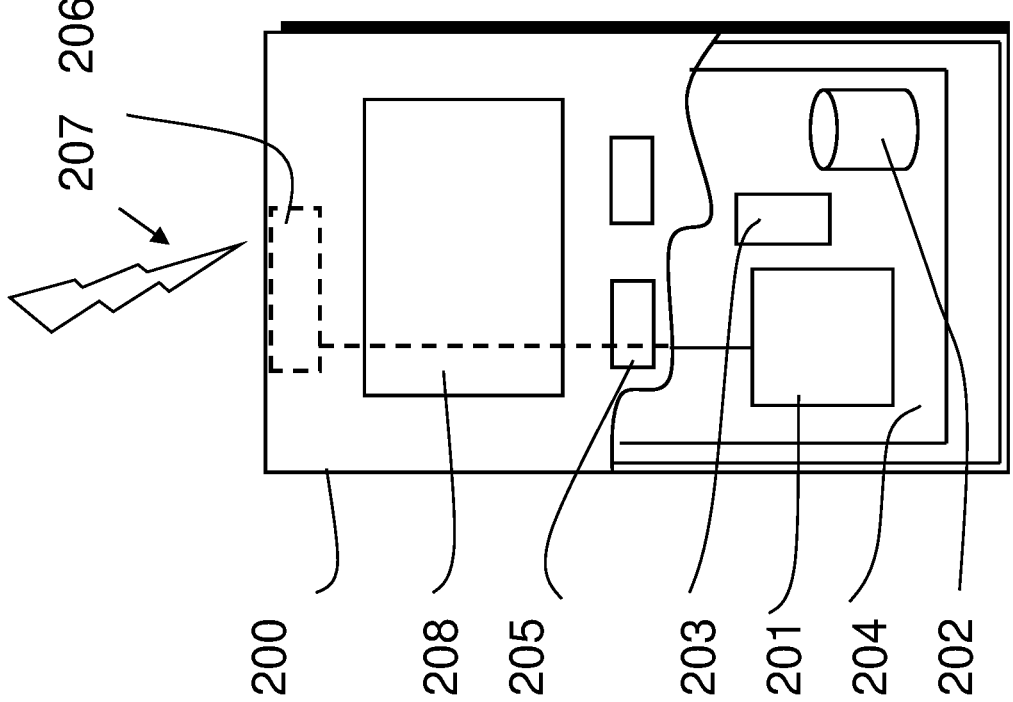
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
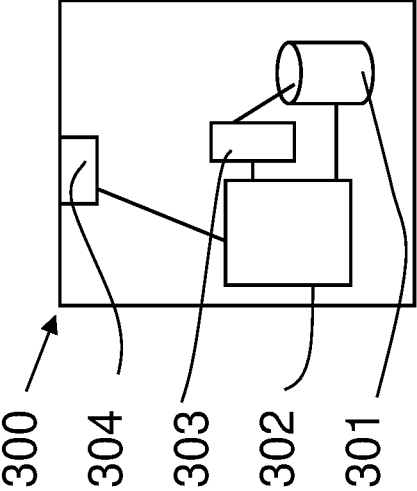
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302,303 and an input/output interface 304. Via the interface the control apparatus can be coupled to a receiver and a transmitter of the base station. The receiver and/or the transmitter may be implemented as a radio front end or a remote radio head.

In 5G Multicast/Broadcast Services (MBS) release 17, it has been decided to enable minimization of data loss for a multicast session using Packet Data Convergence Protocol (PDCP) Sequence Number (SN) synchronization among multiple cells.

One of the solutions to synchronize PDCP SN is to use a shared CU UP entity hosting a PDCP entity of the multiple cells and providing the same PDCP configuration.

When a CU CP asks to join the multicast/broadcast distribution tree, according to the current solution, the second and subsequent CU CPs requesting to use a shared CU UP node do not need to trigger a NG distribution setup request to ask MB-SMF/MB-UPF to send the multicast traffic to the shared CU UP NG-U TNL address because the shared CU-UP already receives it.

However, if those CU CPs do not trigger the NG Distribution setup request, those CU CPs will not be registered to the AMF and will not be informed, by the MB-SMF, of a subsequent Activation Request. In other words, those CU CPs will not be added to the control plane distribution tree for receiving subsequent Activation (or Deactivation) Request messages.

When a CU CP asks to leave the distribution tree, according to the current solution, if a CU CP has no more UEs involved by the CU UP it controls, the CU CP sends an NGAP Distribution Release Request towards AMF/MB-SMF including the NG-U TNL unicast address of the CU UP to ask removal.

However, when using a shared CU UP, shared with other CU CPs, a given CU CP shall not ask removal of the shared CU UP address unless it is the last CU CP to use it. At the same time it should still send the NG Distribution release request to be deregistered from AMF for subsequent Activation Request, in other words, to be removed from the control plane distribution tree for subsequent receiving of the Activation (or Deactivation) Request messages.

FIG. 4 shows a flowchart of a method according to an example embodiment. The method may be performed at a core network node, for example a Session Management Function of the core network such as a MB-SMF (Multicast Broadcast Session Management Function).

In S1, the method comprises receiving information related to a shared centralised unit user plane (CU UP) from a radio access network, RAN, node or an access management function of the core network.

In S2, the method comprises determining, based on the information, whether to configure a user plane function of the core network, such as an MB-UPF (Multicast Broadcast User Plane Function), to deliver data or to terminate delivery of data for the multicast/broadcast session towards the shared CU UP.

If so, in S3, the method comprises, configuring the user plane function to deliver data or to terminate delivery of data for the multicast/broadcast session towards the shared CU UP.

FIG. 5 shows a flowchart of a method according to an example embodiment. The method may be performed at a RAN node (e.g. a CU CP of a RAN node such as a gNB).

In T1, the method comprises providing information related to a shared centralised unit user plane (CU UP) for a multicast/broadcast session to a multicast/broadcast session management function of a core network or an access management function of the core network for use in determining whether to configure a user plane function to deliver data or to terminate the delivery of data for the multicast/broadcast session towards the shared CU UP.

The RAN node may comprise a CU CP.

The RAN node may provide the information to the MB-SMF via an AMF. In other words, a RAN node (or CU CP) may provide the information to an AMF and the AMF forwards the information to the MB-SMF.

An identity associated with a shared CU-UP may be a shared NG-U address, e.g., a transport layer address of the NG-U interface. An identity associated with a shared CU-IP may be a logical network node identity globally unique in the PLMN.

The method may comprise storing the identity of RAN nodes in association with an identity associated with the shared CU UP.

In a first example embodiment, the addition/removal of shared NG-U address is managed by RAN nodes.

The method may comprise receiving an indication from the CU UP at the RAN node (or at CU CP of the RAN node) that an identity associated with the CU UP has been provided to another RAN node (CU CP). It can be inferred that the identity associated with the CU UP has thus been provided to a user plane function of the core network (MB-UPF). The information may be provided from the RAN node to the SMF (e.g., from CU CP to MB-SMF) based on the indication.

The information related to the shared CU UP may comprise an indication that delivery of data for the multicast/broadcast session towards the shared CU UP has already been provided or requested (e.g., to a MB-UPF).

The indication from the shared CU UP to the RAN node that delivery of data for the multicast/broadcast session towards the shared CU UP has already been requested may be the absence of a NG-U address in the E1 bearer context setup response or a shared NG-U address already available indicator in the E1 bearer context setup response.

The method may comprise configuring a user plane function (MB-UPF) to deliver data for the multicast/broadcast session towards the shared CU UP if no indication that delivery of data for the multicast/broadcast session towards the shared CU UP has already been requested is received.

For example, when a CU CP configures an MBS session, it detects whether a "shared CU UP" offers the NG-U address and may select that shared CU UP. Optionally, the CU UP informs the CU CP whether a shared NG-U address has already been allocated for the MBS session (and so provided to the MB-UPF). The CU UP may provide an indication that the shared NG-U address has already been allocated for the MBS session (in other words, provided to the MB-UPF) by not including the NG-U address in the E1 bearer context setup response or by including a shared NG-U address already available indicator.

If the CU CP uses the NG-U address of a shared CU UP, the CU CP sends a NGAP Distribution Request with a new shared NG-U address already delivered indicator IE or equivalent IE in the Distribution Setup Request Transfer towards the CN (for example, MB-SMF).

When the MB-SMF receives the NGAP Distribution Request Transfer with the new shared NG-U address already delivered indicator IE it continues to store the AMF ID for subsequent notification of Activation Request but it does not contact MB-UPF to update the distribution tree of the multicast/broadcast session with an NG-U address, in other words determines not to configure the MB-UPF to deliver data for the multicast/broadcast session towards the shared CU UP.

The method may comprise receiving an indication at the CU UP from the RAN node that the apparatus is no longer involved in the multicast/broadcast session and comprise receiving at the RAN node in response from the shared CU UP an indication whether the delivery of data for the multicast/broadcast session towards the identity associated with the shared CU UP is to be continued. The method may comprise further providing the information from the RAN node to the MB SMF based on the indication.

The information related to the shared CU UP may comprise an indication that the RAN node is no longer involved in the multicast/broadcast session and an indication whether the delivery of data for the multicast/broadcast session towards the shared CU UP is to be continued.

The indication may be a no removal indicator and/or the absence of the NG-U transport address.

The method may comprise configuring a user plane function (MB-UPF) to terminate the delivery of data for the multicast/broadcast session towards the shared CU UP if an indication that the RAN node is no longer involved in the multicast/broadcast session and no indication that the delivery of data for the multicast/broadcast session towards the shared CU UP is to be continued is received.

For example, when the CU CP has no more UEs involved in gNB it contacts the CU UP, the CU UP informs CU CP that it is the last CU CP involved for the shared address of this MBS session. Based on this, the CU CP triggers the NGAP Distribution Release Request message newly including in the Distribution Release Request Transfer IE a no removal indicator and/or not including the NG-U transport address.

When the MB SMF receives the NGAP Distribution release request transfer without the NG-U transport address and/or with the "no removal indicator", it does not request the MB UPF to remove delivery for the NG-U address of the distribution tree of the MBS session.

In a second example embodiment, the addition and/or removal of shared NG-U address is managed by the MB SMF.

The information may comprise an identity associated with the RAN node and an indication whether delivery of data or termination of the delivery of data is requested (e.g., a NGAP Distribution Setup Request or a NGAP Distribution Release Request, respectively).

The method may comprise configuring a user plane function (MB-UPF) to deliver data for the multicast/broadcast session towards the shared CU UP if an indication that the delivery of data is requested is received and no other RAN node previously requested the MB-SMF delivery of data for the multicast/broadcast session towards the shared CU UP.

The method may comprise configuring a user plane function (MB-UPF) to terminate the delivery of data for the multicast/broadcast session towards the shared CU UP if an indication that the termination of the delivery of data is requested is received and no other RAN node still requires the delivery of data for the multicast/broadcast session towards the shared CU UP.

The information may further comprise at least one of an indication that the CU UP is shared and a global identity associated with the CU UP.

For example, when the CU CP decides to use a "shared CU UP", the CU CP sends the NGAP Distribution Setup Request including in the Distribution Setup Request Transfer towards MB SMF the MBS session ID, the shared NG-U address, and the gNB ID (of the CU CP) and optionally shared indicator (i.e. an indication that the CU UP is shared) and/or optionally a globally unique identifier of the CU UP (gNB ID, CU UP ID).

When the MB-SMF receives the NGAP Distribution Setup Request Transfer including the MBS session ID, the NG-U address, and the gNB ID and optionally the shared indicator and/or optionally the (gNB ID, CU UP ID), the MB-SMF continues to store the AMF ID for subsequent notification of Activation Request but it selectively contacts the MB UPF to add multicast delivery to the NG-U address only if not yet done from request of another CU CP (identified by gNB ID), possibly for the same CU UP ID (if (gNB ID, CU UP) indicated).

When the CU CP has no more UEs involved in gNB for the MBS session, the CU CP triggers the NGAP Distribution Release Request message with the MBS session ID, the NG-U address and newly including in the Distribution Release Request Transfer IE a gNB ID (of the CU CP) and optionally shared indicator, and/or optionally (gNB ID, CU UP ID) as global identifier of the CU UP.

When the MB SMF receives the NGAP Distribution release request transfer including the MBS session ID, the NG-U address and newly the gNB ID, and optionally shared indicator and/or optionally (gNB ID, CU UP ID), it selectively requests the MB UPF to remove the multicast delivery to the NG-U address for the MBS session only if no other gNBs (identified by gNB ID), i.e. CU CPs, are using this NG-U address or this (gNB ID, CU UP ID).

Figure 6:
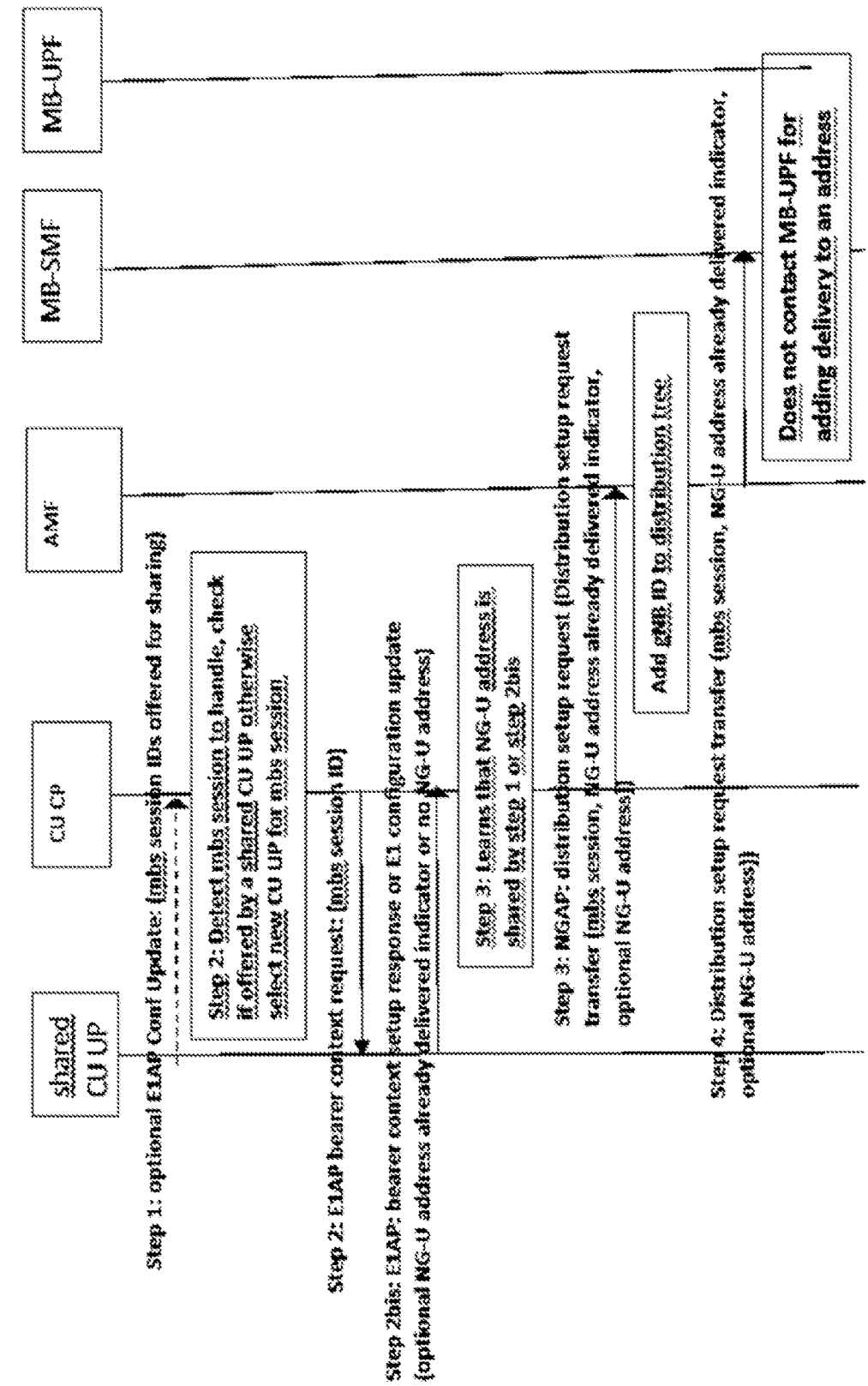
FIG. 6 shows a signalling flow for an example case where the addition of a shared NG-U address is managed by the RAN nodes.

FIG. 6 shows a signalling flow for an example case where the addition of a shared NG-U address is managed by the RAN nodes.

In step 1 a shared CU UP may indicate that it offers sharing for some MBS sessions.

In step 2 a CU CP needs to create a context for an MBS session and decides to use the shared CU UP for the E1 bearer context setup/modify request.

In step 2bis, the shared CU UP may indicate to the requesting CU CP that the requested address can be shared by either not including an NG-U address for the multicast delivery, or newly including an NG-U address already delivered indicator IE in the E1AP bearer context setup/modify response message.

In step 3, the CU CP determines that it can use a shared NG-U address from the shared CU UP either from step 1 or step 2bis and decides to include a NG-U address already delivered indicator in the NGAP Distribution Setup Request Transfer IE of the NGAP Distribution Setup Request message.

In step 4, the AMF relays the NGAP Distribution Setup Request Transfer IE towards the MB-SMF while adding the gNB ID into the control plane distribution tree for, e.g., subsequent receiving and/or sending of Activation request. The MB-SMF receiving the NGAP Distribution Setup Request Transfer IE with a new NG-U address already delivered indicator determines to not contact the MB-UPF for requesting delivering the multicast data towards this NG-U address.

Figure 7:
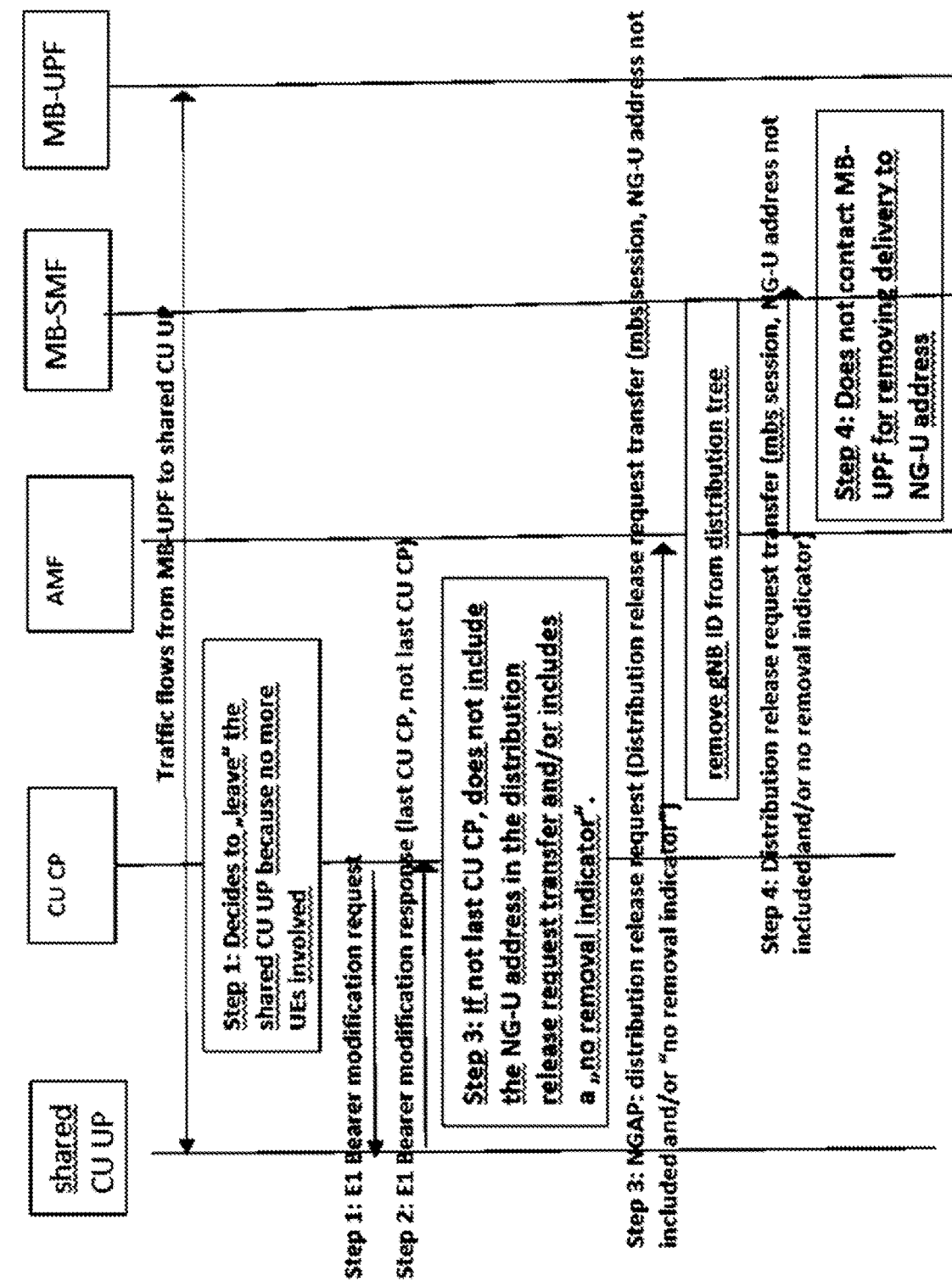
FIG. 7 shows a signalling flow for an example case where the removal of a shared NG-U address is managed by the RAN nodes.

FIG. 7 shows a signalling flow for an example case where the removal of a shared NG-U address is managed by the RAN nodes.

In step 1, the CU CP has no more UEs involved in the MBS session and therefore decides to release the NG-U delivery from the shared CU UP which it was using for the multicast delivery. It sends the E1AP bearer context modi- fication to the shared CU UP.

In step 2, the shared CU UP notifies the CU CP in the E1AP bearer modification response whether it is the last CU CP using the shared CU UP and NG-U address for that MBS session or not.

In step 3, if it is not the last CU CP, the CU CP determines to notify the MB SMF by not including the NG-U address in the NGAP distribution release request transfer IE of the NGAP distribution release request message and/or including a "no removal indicator" in the NGAP distribution release request transfer IE of the NGAP distribution release request message. The AMF relays the NGAP distribution release request transfer IE while removing the CU CP (gNB) from the control plane distribution tree for, e.g., subsequent receiving/sending of Activation request.

In step 4, the MB SMF newly determines to not contact the MB UPF to remove the NG-U address from the delivery of multicast data based on either receiving the "no removal indicator" or based on not receiving the NG-U address.

Figure 8:
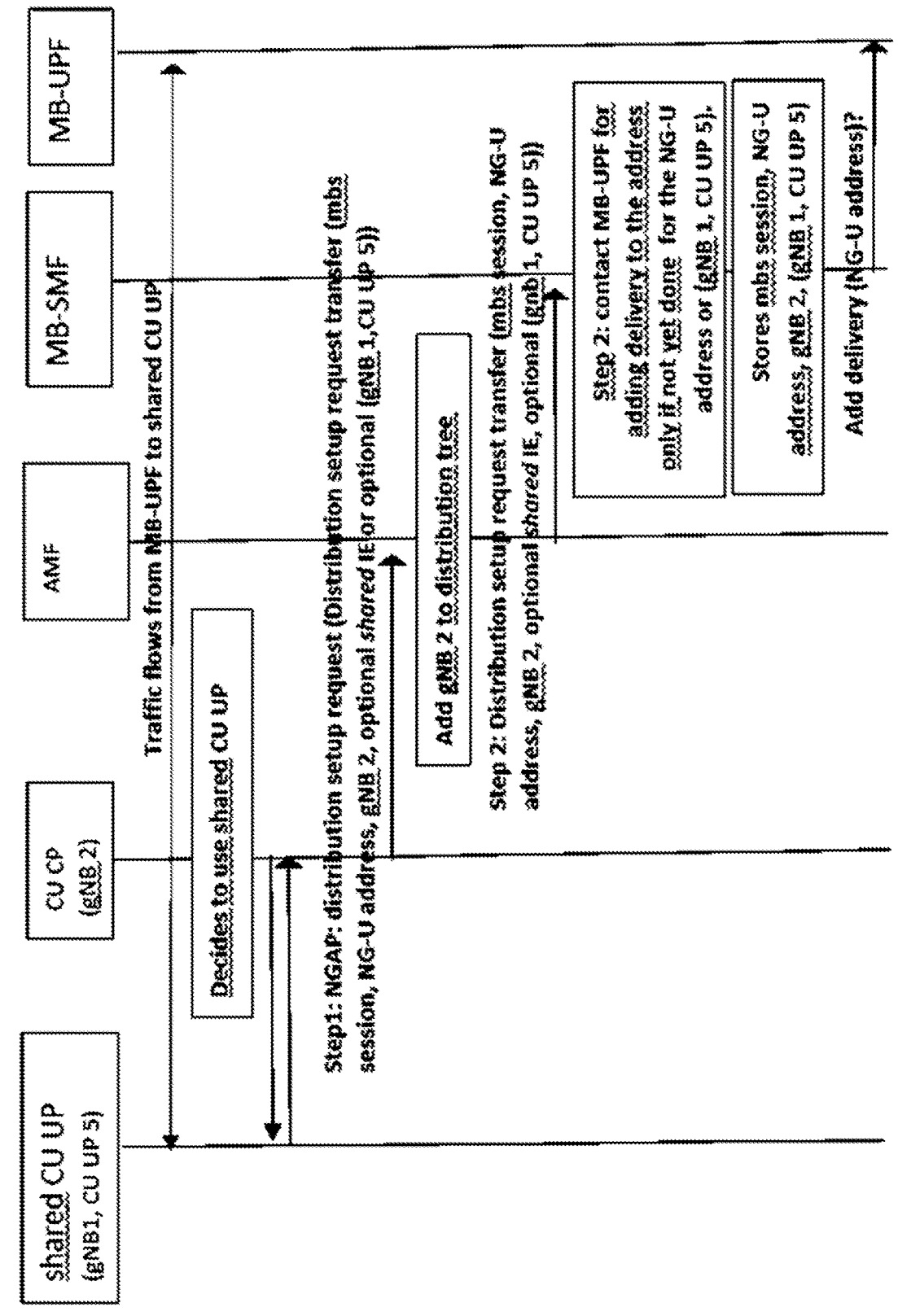
FIG. 8 shows a signalling flow for an example case where the addition of a shared NG-U address is managed by the MB-SMF.

FIG. 8 shows a signalling flow for an example case where the addition of a shared NG-U address is managed by the MB-SMF.

In step 1, a CU CP determines to use a shared CU UP to create an MBS context for an MBS session. The CU CP includes its gNB 2 identity, and may optionally add a shared indicator and/or a unique identifier of the CU UP (gNB 1, CU UP 5) into the NGAP distribution setup request transfer IE of the NGAP distribution setup request message towards the MB-SMF.

In step 2, the AMF relays the NGAP distribution setup request transfer IE towards the MB SMF while adding the gNB 2 into the control plane distribution tree for, e.g., subsequent receiving/sending of Activation Request. The MB SMF receiving the NGAP distribution setup request transfer IE determines whether to contact the MB UPF to deliver the multicast data to the NG-U address based on whether another CU CP has not already requested the delivery for that NGU address or for that shared CU UP. The MB SMF may also store the information gNB 2, and/or (gNB 1, CU UP 5) for further use.

Figure 9:
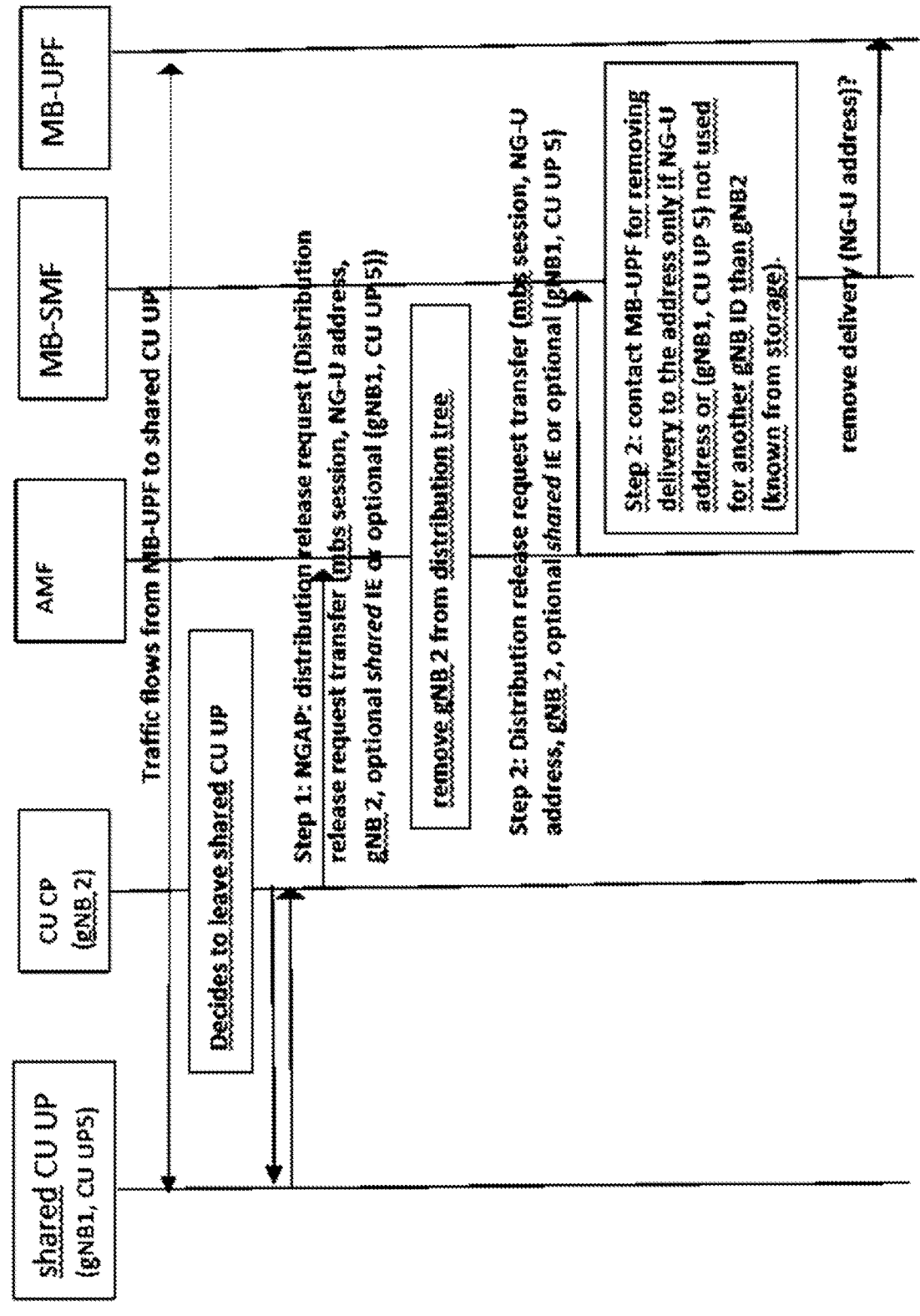
FIG. 9 shows a signalling flow for an example case where the removal of a shared NG-U address is managed by the MB-SMF.

FIG. 9 shows a signalling flow for an example case where the removal of a shared NG-U address is managed by the MB-SMF.

In step 1, the CU CP decides to leave the multicast delivery for a given MBS session because it has no more joined UEs for that MBS session. It sends the NGAP Distribution release request message and includes, in the NGAP Distribution release request transfer IE, in addition to the NG-U address and MBS session ID, the gNB 2 and optionally a shared Indicator and/or a global identifier for the shared CU UP such as (gNB 1, CU UP 5).

In step 2, the AMF relays the NGAP Distribution release request transfer IE while removing gNB 2 from the control plane distribution tree for, e.g., subsequent receiving/ sending of Activation Request. The MB SMF receiving the NGAP Distribution release request transfer IE determines whether to contact the MB UPF for removing the delivery of the multicast data to the NG-U address based on whether this shared NG-U address and/or this (gNB 1, CU UP 5) is not in use for delivery upon request from another CU CP than the CU CP (gNB 2). It can determine this from previous storage when receiving the NGAP Distribution setup request transfer IE gNB ID x, and/or (gNB y, CU UP z).

An apparatus may comprise means for, at a multicast/ broadcast session management function of a core network, receiving information related to a shared centralised unit user plane, CU UP for a multicast/broadcast session, from a radio access network, RAN, node or an access management function of the core network, determining, based on the information, whether to configure a user plane function of the core network to deliver data or to terminate delivery of data for the multicast/broadcast session towards the shared CU UP and, if so, configuring the user plane function to deliver data or to terminate delivery of data for the multicast/ broadcast session towards the shared CU UP.

Alternatively, or in addition, an apparatus may comprise means for, at a radio access network, RAN, node providing information related to a shared centralised unit user plane, CU UP, for a multicast/broadcast session to a multicast/ broadcast session management of a core network for use in determining whether to configure a user plane function of the core network to deliver data or to terminate the delivery of data for the multicast/broadcast session towards the shared CU UP.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising:
at least one processor and at least one memory including a computer program code, the at least one memory storing computer program code of a multicast/broadcast session management function for a core network, the computer program code, when executed by the at least one processor, causing the apparatus at least to perform operations, the operations comprising:
receiving information related to a shared centralised unit user plane, shared CU UP, for a multicast/broadcast session, from a radio access network, RAN, node or an access management function of the core network, wherein the information comprises an identity associated with the RAN node and an indication that indicates whether delivery of data or termination of the delivery of data is requested;
determining, based on the information, whether to configure a user plane function of the core network to deliver data or to terminate the delivery of data for the multicast/broadcast session towards the shared CU UP, wherein the determining comprises determining to configure, in an instance that no other RAN node previously requested the delivery of data for the multicast/broadcast session towards the shared CU UP and the indication indicates that the delivery of data is requested, the user plane function to deliver the data for the multicast/broadcast session towards the shared CU UP; and
configuring, based on the determining, the user plane function to deliver the data or to terminate the delivery of data for the multicast/broadcast session towards the shared CU UP.

2. The apparatus according to claim 1, wherein the determining further comprises determining to configure the user plane function to terminate the delivery of data for the multicast/broadcast session towards the shared CU UP in an instance an indication that the termination of the delivery of data is requested is received and no other RAN node still requires the delivery of data for the multicast/broadcast session towards the shared CU UP.

3. The apparatus according to claim 1, wherein the information further comprises at least one of an indication that the shared CU UP is shared and a global identity associated with the shared CU UP.

4. The apparatus according to claim 1, wherein the operations further comprise storing the identity associated with the RAN node in association with an identity associated with the shared CU UP.

5. The apparatus according to claim 4, wherein the identity associated with the shared CU UP is a transport layer address.

6. The apparatus according to claim 1, wherein the RAN node comprises a centralised unit control plane, CU CP, and wherein the receiving the information comprises receiving the information from the RAN node and wherein the receiving the information from the RAN node comprises receiving the information-from the CU CP.

7. A method of a network node of a core network, the network node implementing a multicast/broadcast session management function, the method comprising:

receiving information related to a shared centralised unit user plane, shared CU UP, for a multicast/broadcast session, from a radio access network, RAN, node or an access management function of the core network, wherein the information comprises an identity associated with the RAN node and an indication that indicates whether delivery of data or termination of the delivery of data is requested;

determining, based on the information, whether to configure a user plane function of the core network to deliver data or to terminate the delivery of data for the multicast/broadcast session towards the shared CU UP, wherein the determining comprises determining to configure, in an instance that no other RAN node previously requested the delivery of data for the multicast/broadcast session towards the shared CU UP and the indication indicates that the delivery of data is requested, the user plane function to deliver the data for the multicast/broadcast session towards the shared CU UP; and configuring, based on the determining, the user plane function to deliver the data or to terminate the delivery of data for the multicast/broadcast session towards the shared CU UP.

8. The method according to claim 7, further comprising:

receiving another information related to the shared CU UP, for the multicast/broadcast session, from the RAN node or an access management function of the core network, wherein the information comprises the identity associated with the RAN node and another indication that indicates whether the delivery of data or the termination of the delivery of data is requested; and determining, based on the another information, whether to configure the user plane function of the core network to deliver the data or to terminate the delivery of data for the multicast/broadcast session towards the shared CU UP, wherein the determining comprises determining to configure, in an instance that no other RAN node previously requested the delivery of data for the multicast/broadcast session towards the shared CU UP and the indication indicates that the delivery of data is requested, the user plane function to deliver the data for the multicast/broadcast session towards the shared CU UP;

wherein the determining comprises determining to configure, in an instance an another indication that no other RAN node still requires the delivery of data for the multicast/broadcast session towards the shared CU UP and the another indication indicates that the termination of the delivery of data is requested, the user plane function to terminate the delivery of the data for the multicast/broadcast session towards the shared CU UP.

9. The method according to claim 7, wherein the information further comprises at least one of an indication that the shared CU UP is shared and a global identity associated with the shared CU UP.

10. The method according to claim 7, further comprising storing the identity associated with the RAN node in association with an identity associated with the shared CU UP.

11. The method according to claim 10, wherein the identity associated with the shared CU UP is a transport layer address.

12. The method according to claim 7, wherein the RAN node comprises a centralised unit control plane, CU CP, and wherein the receiving the information comprises receiving the information from the RAN node and wherein the receiving the information from the RAN node comprises receiving the information-from the CU CP.

13. A non-transitory computer readable storage medium storing program instructions of a multicast/broadcast session management function for a core network, which, when executed by an apparatus, cause the apparatus to perform at least the following operations, the operations comprising:

receiving information related to a shared centralised unit user plane, shared CU UP, for a multicast/broadcast session, from a radio access network, RAN, node or an access management function of the core network, wherein the information comprises an identity associated with the RAN node and an indication that indicates whether delivery of data or termination of the delivery of data is requested;

determining, based on the information, whether to configure a user plane function of the core network to deliver data or to terminate the delivery of data for the multicast/broadcast session towards the shared CU UP, wherein the determining comprises determining to configure, in an instance that no other RAN node previously requested the delivery of data for the multicast/broadcast session towards the shared CU UP and the indication indicates that the delivery of data is requested, the user plane function to deliver the data for the multicast/broadcast session towards the shared CU UP; and configuring, based on the determining, the user plane function to deliver the data or to terminate the delivery of data for the multicast/broadcast session towards the shared CU UP.

14. The non-transitory computer readable storage medium according to claim 13, wherein the operations further comprise:

session, from the RAN node or an access management function of the core network, wherein the information comprises the identity associated with the RAN node and another indication that indicates whether the delivery of data or the termination of the delivery of data is requested; and determining, based on the another information, whether to configure the user plane function of the core network to deliver the data or to terminate the delivery of data for the multicast/broadcast session towards the shared CU UP, wherein the determining comprises determining to configure, in an instance that no other RAN node previously requested the delivery of data for the multicast/broadcast session towards the shared CU UP and the indication indicates that the delivery of data is requested, the user plane function to deliver the data for the multicast/broadcast session towards the shared CU UP; and wherein the determining further comprises determining to configure, in an instance an another indication that no other RAN node still requires the delivery of data for the multicast/broadcast session towards the shared CU UP and the another indication indicates that the termination of the delivery of data is requested, the user plane function to terminate the delivery of the data for the multicast/broadcast session towards the shared CU UP.

15. The non-transitory computer readable storage medium according to claim 13, wherein the information further comprises at least one of an indication that the shared CU UP is shared and a global identity associated with the shared CU UP.

16. The non-transitory computer readable storage medium according to claim 13, wherein the operations further comprise storing the identity associated with the RAN node in association with an identity associated with the shared CU UP.

17. The non-transitory computer readable storage medium according to claim 16, wherein the identity associated with the shared CU UP is a transport layer address.

18. The non-transitory computer readable storage medium according to claim 13, wherein the RAN node comprises a centralised unit control plane, CU CP, and wherein the receiving the information comprises receiving the information from the RAN node and wherein the receiving the information from the RAN node comprises receiving the information-from the CU CP.

\* \* \* \* \*